United States Patent
Goltsos

[15] 3,688,518
[45] Sept. 5, 1972

[54] REFRIGERATED CONVEYOR SYSTEM

[72] Inventor: Costas E. Goltsos, Weston, Mass.

[73] Assignee: Teckton, Inc., Waltham, Mass.

[22] Filed: Oct. 16, 1970

[21] Appl. No.: 81,466

[52] U.S. Cl. ..........................62/374, 62/63, 62/378, 62/380, 214/8.5 H
[51] Int. Cl. ............................................F25d 17/02
[58] Field of Search......62/62, 63, 64, 341, 378, 374, 62/380, 382; 214/8.5 H, 8.5 K

[56] References Cited

UNITED STATES PATENTS

| | | | |
|---|---|---|---|
| 2,538,734 | 1/1951 | Patterson | 62/378 X |
| 3,485,055 | 12/1969 | Webster et al. | 62/63 |
| 2,184,990 | 12/1939 | Conn | 62/64 |
| 2,365,352 | 12/1944 | Moffitt | 62/63 |
| 2,691,278 | 10/1954 | Knight, Jr. | 62/380 X |
| 2,607,201 | 8/1952 | Kleist | 62/64 X |
| 2,695,125 | 11/1954 | Bowen | 214/8.5 K X |
| 3,251,188 | 5/1966 | Dean et al. | 62/382 X |
| 3,304,728 | 2/1967 | DeHaan | 62/45 |

*Primary Examiner*—Meyer Perlin
*Assistant Examiner*—Ronald C. Capossela
*Attorney*—Wolf, Greenfield & Sacks

[57] ABSTRACT

A system for quick freezing of articles in which an elongated, vertically oriented housing is provided with elevator means for successively and incrementally lowering trays containing the articles through a freezing chimney within the housing. A cryogenic coolant is introduced through metered orifices along vertical pipes extending upwardly through the chimney. The internal chimney surfaces are arranged to cooperate with the trays and coolant orifices so that the articles in the trays are subjected to a zig-zag, reversed flow of coolant as the trays advance downwardly through the chimney.

18 Claims, 11 Drawing Figures

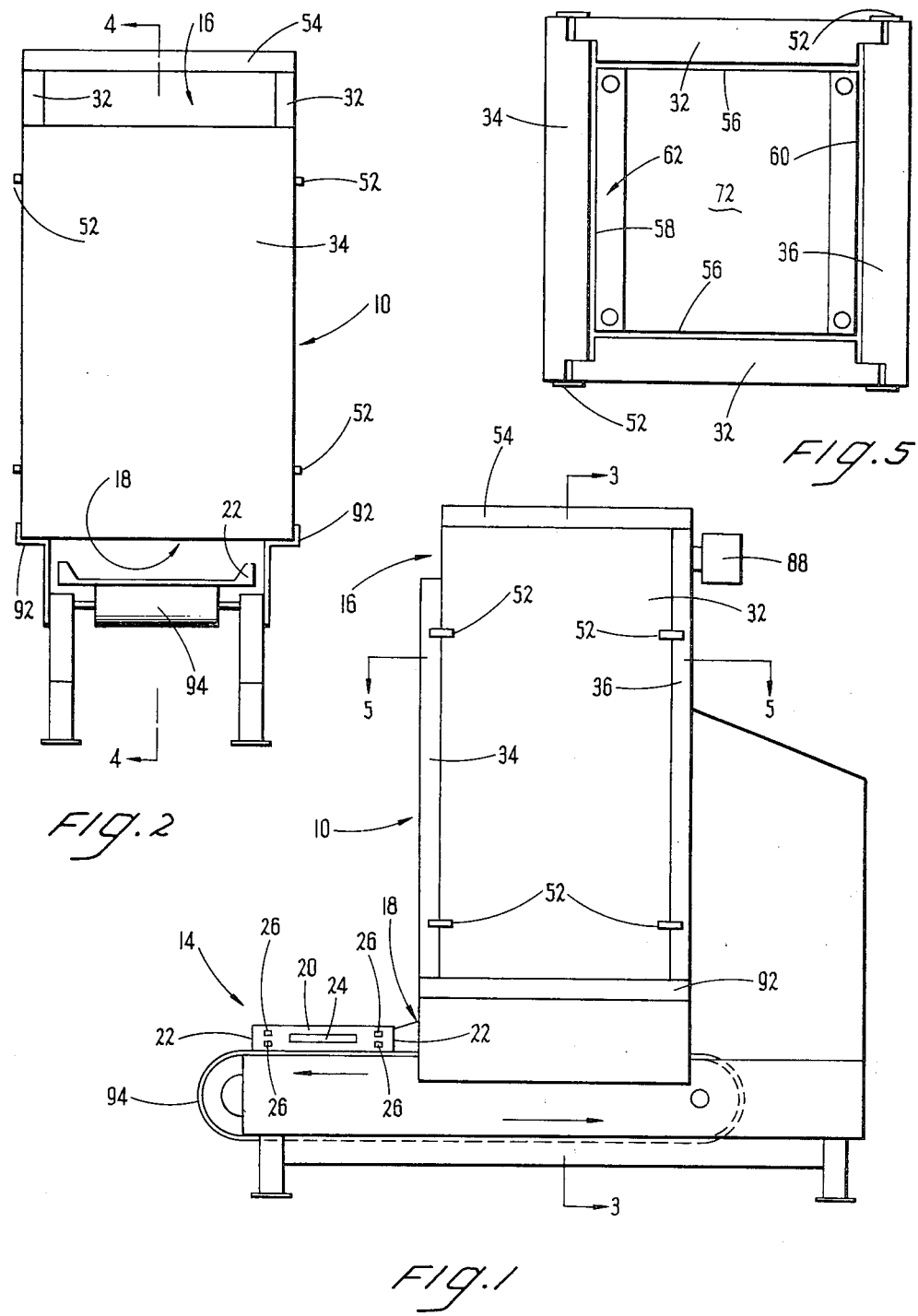

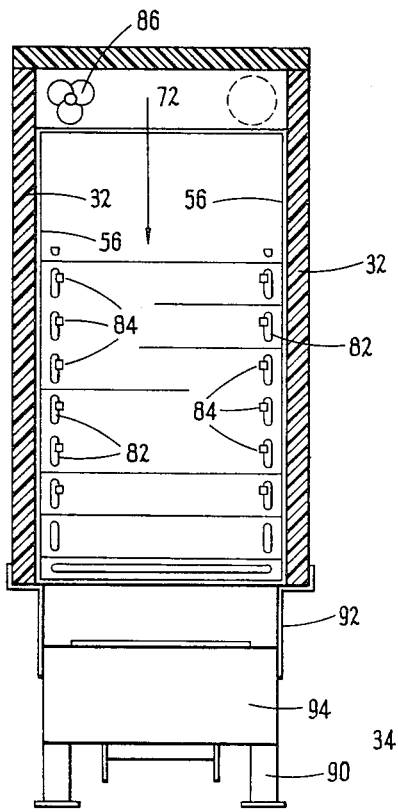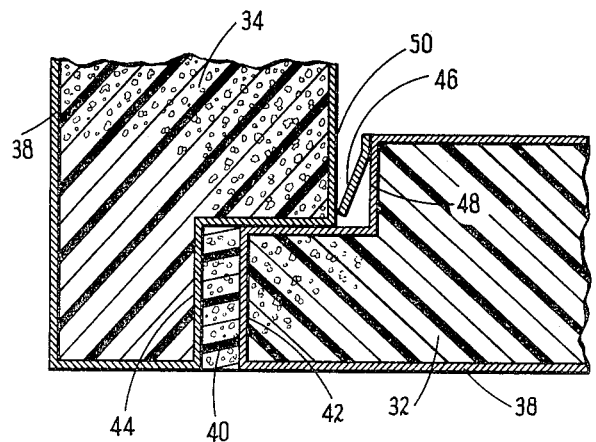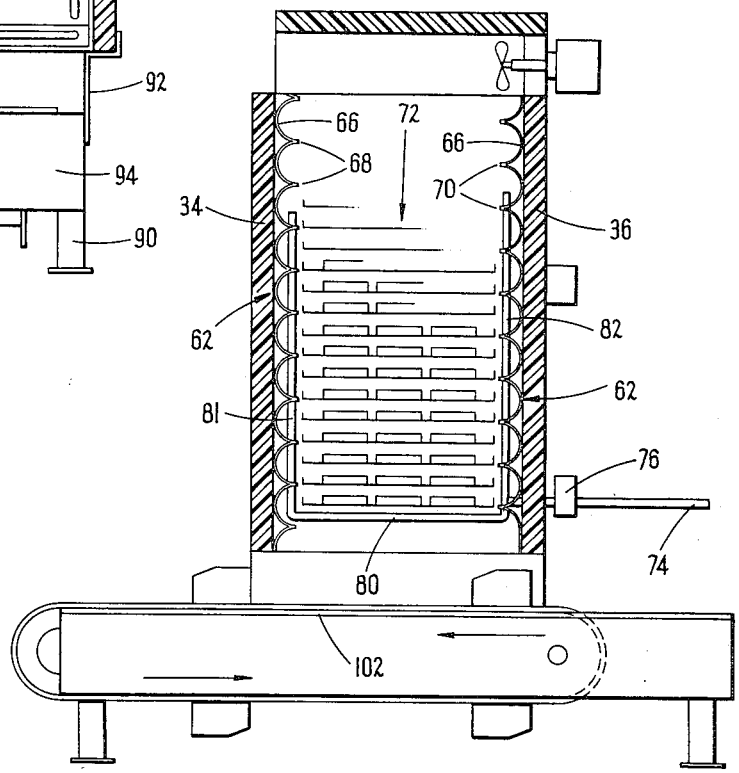

PATENTED SEP 5 1972 3,688,518

INVENTOR
Costas E. Holtsos
BY
Wolf, Greenfield & Sacks

REFRIGERATED CONVEYOR SYSTEM

SUBJECT MATTER OF THE INVENTION

This invention relates to a method and apparatus for the quick-freezing of articles such as food products and the like.

BACKGROUND OF THE INVENTION

It has been conventional in quick-freezing of raw or cooked foods and other articles to advance the articles along a conveyor within a relatively long cooling tunnel. These systems require extensive space and considerable quantities of the cooling medium, such as liquid nitrogen. Additionally, these systems have relatively low efficiencies because of the inherent large surface areas exposed to the coolant and because the coolant does not always come into complete contact with the articles to be frozen. It is among the primary objects of the invention to provide an improved method and apparatus for quick-freezing articles which avoids these and other problems associated with currently employed freezing techniques.

SUMMARY OF THE INVENTION

In brief, the invention includes the use of an improved freezing device having an insulated, heightwise extending freezing chimney with an inlet at its upper end and an outlet at its lower end. Trays containing the articles to be frozen are introduced into the inlet at the top of the chimney and are stacked one atop the other vertically within the chimney. The stack of trays advances downwardly in incremental steps. The trays are designed so that when stacked, their contained articles will be exposed to a cryogenic coolant which is sprayed across the articles in the trays. The internal surface of the chimney is designed to cooperate with the trays so that when the stack of trays is advanced downwardly in incremental steps, flow of coolant will be reversed over and in relation to each tray. Thus, the coolant flows upwardly and along a transverse zig-zag path to achieve maximum cooling effect along the height of the chimney.

Means are provided for automatically withdrawing the lowermost tray containing the frozen articles, from the stack and for transporting the tray away from the chimney. In this arrangement, only the lowermost tray in the stack is supported by pinions which engage the tray. The pinions also serve as the elevator means in that they may be rotated incrementally to release the lowermost tray and simultaneously engage the next tray in the stack as the entire stack gravitates downwardly one tray increment. Additionally, means are provided for effecting an efficient, simple seal between particular elements of the device, which seal is unaffected by the cryogenic temperatures at which the device is operated.

It is among the primary objects of the invention to provide an improved system for rapidly freezing articles in which means are provided for maximizing the efficient use of a cryogenic coolant.

Another object of the invention is to provide a compact, inexpensive device for handling efficiently the articles during the rapid freezing process.

Still another object of the invention is to provide an improved method and apparatus for freezing quickly articles in succession, such as raw or cooked food, on a continuous basis using a liquid-gaseous coolant such as nitrogen.

A further object of the invention is to provide an improved method and apparatus for employing a coolant, such as liquid nitrogen, in the quick-freezing of articles such as food on a continuous basis. In this regard, the invention employs a technique which provides improved circulation of the coolant in a reciprocal, zig-zag path over the articles being cooled.

Still another object of the invention is to provide an improved method and apparatus for conveying articles continuously through a quick-freezing system in an automatic manner.

Another object of the invention is to provide a gravity fed system for advancing the articles to be frozen through the freezing device.

DESCRIPTION OF THE DRAWINGS

These and other objects and advantages of the invention will be understood more fully from the following detailed description, with reference to the accompanying drawings wherein:

FIG. 1 is a somewhat diagrammatic side elevation of the device employed in the invention;

FIG. 2 is a front elevation of the device as seen from the left in FIG. 1 and illustrating the input and output ends;

FIG. 3 is a sectional elevation through the device as seen along the lines 3—3 of FIG. 1;

FIG. 4 is a sectional elevation of the device as seen along the line 4—4 of FIG. 2;

FIG. 5 is a plan sectional view of the device as seen along the line 5—5 of FIG. 1;

FIG. 6 is an enlarged sectional view of the corner junction between a pair of panels shown in FIG. 5;

DESCRIPTION OF THE PREFERRED EMBODIMENT

Figure 9:
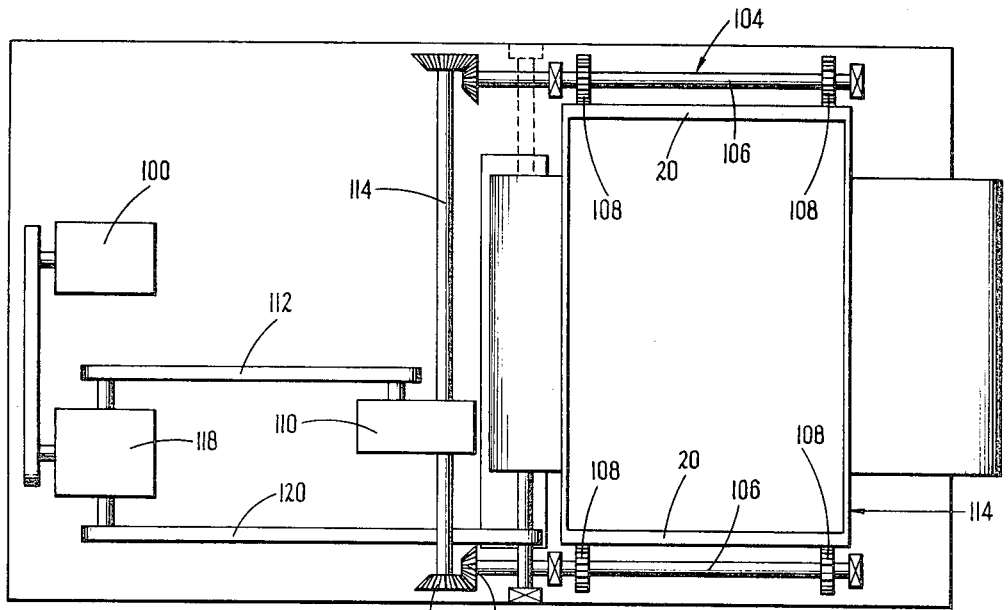
FIG. 9 is a plan illustration of the main drive of the device as seen from the line 9—9 of FIG. 8.

As shown in FIGS. 1 and 2, the device includes a generally heightwise freezing column 10 and a horizontal conveyor 12. Trays 14 in which the articles, such as raw or cooked fish or meat, are placed, are inserted into an inlet opening 16. The food may be packaged or unpackaged as desired. After the article-bearing trays have advanced downwardly through the column 10, they are withdrawn through the lower, outlet opening 18 and are transported away from column 10 by the conveyor 12.

The trays 14 are formed preferably with a solid bottom wall on which the food articles are supported and continuous sidewalls 20 and front and rear walls 22. The sidewalls may include holes 24 to provide a hand grip and also include two pairs of spaced holes 26 which cooperate with the unloading mechanism that is described more fully herein. Front and rear walls 22 are of a reduced height so that when a number of such trays are stacked, forward-rearward extending passages 28 will be defined between each pair of stacked trays. As described more fully herein, the coolant is caused to flow through the passages 28 into communication with the food contained in each tray. The passages permit the coolant to flow freely over the contained food either forwardly or rearwardly.

In the preferred embodiment of the invention, the freezing column 10 includes a heightwise extending freezing chimney 30 which is surrounded by insulative sidewalls 32 and insulative front and rear walls 34, 36. The insulative walls 32, 34, 36 may be formed of any suitable heat insulative material adapted to adequately insulate thermally the trays, coolant and freezing chimney from ambient temperatures. For example, a variety of commercially available foamed rigid plastic materials may be employed. Each of the walls 32, 34, 36 preferably is wrapped in a thin metallic skin 38 such as stainless steel. In order to increase further the thermal isolation of the freezing chimney 30, the chimney preferably is spaced slightly from the internal surfaces of the walls 32, 34, 36. In addition to enhancing the thermal isolation of the chimney 30, the space between the chimney and the walls 32, 34, 36 further reduces materially any tendency for the chimney 30 to buckle or become bowed as the result of a large thermal gradient which may develop across the chimney walls. It should be noted, in this regard, that the sidewalls 32, 34, 36 may tend to buckle or become bowed during operation because of the relatively large thermal gradient across the thickness of these walls. For example, the inner surface of the walls 32, 34, 36 would tend to contract because of the internal cryogenic temperatures whereas the outer surface of these walls would contract only slightly thus producing an outwardly bowed effect. By isolating structurally and thermally the freezing chimney 30 from the walls 32, 34, 36 any tendency for the chimney to bow or buckle is minimized so as not to interfere with the passage of the trays 14 downwardly through the chimney.

The sidewalls 32, 34, 36 are connected and sealed to each other as shown in FIGS. 5 and 6. The heightwise extending edges of the walls mate in a sealed rabbett joint. As shown more clearly in FIG. 6, the walls at their juncture do not abut against each other but, instead, are provided with a resilient insulative strip gasket 40 between the end 42 of the walls and the rabbetted shoulder 44 on the other wall. In order to permit flexure of the walls 32, 34, 36 while maintaining an adequate seal, each rabbet juncture also includes a heightwise extending resilient stainless steel strip 46 which is secured to the rabbeted shoulder 48 and which is naturally biased toward the inner surface 50 of the other wall in the joint. The foregoing arrangement is employed in each of the four corners of the freezing column 10 with the foregoing being representative of each corner. Thus, with the inner stainless steel strip 46 and the outer resilient strip gasket 40, an effective seal is maintained along the joined edges of the walls 32, 34, 36 even when the walls become bowed or buckled as a result of the thermal gradient across the walls. Additionally, because there is no substantial structural connection between the chimney 30 and walls, any such buckling is not transmitted to the chimney and would not distort or otherwise obstruct the passage through the chimney. The walls 32, 34, 36 are connected together by appropriate clips 52 which preferably may be locked or unlocked simply and manually. This also facilitates removal of one or more of the sidewalls for inspection, cleaning or other purposes. The front insulative wall 34 is shorter than the other walls to define the inlet opening 16. The column 10 is capped by a top wall 54 of the same general construction as the other walls 32, 34, 36.

As shown in FIGS. 3, 4, and 5, the freezing chimney 30 is of generally rectangular cross-sectional configuration having sidewalls 56 and front and rear walls 58, 60. The chimney walls may beformed from stainless steel sheet. As mentioned above, the chimney walls 56, 58, 60 are spaced slightly from the internal surfaces of their associated insulative walls 32, 34, 36. The front and rear walls 58, 60 of the chimney are provided with inwardly facing corrugated sheets 62, each of which defines a series of curved deflectors 64, 66. The deflectors 64, 66 have facing parallel edges 68, 70, respectively, with the edges 68 being vertically offset with respect to the edges 70 in an amount equal to one-half the vertical distance between adjacent edges. This staggered arrangement of deflectors cooperates with tray configuration to provide the zig-zag coolant flow as will be described below. The trays 14 are dimensioned with respect to the chimney passage 72 so that the sidewalls 20 fit closely against the chimney sidewalls 56 and so that the front and rear walls 22 of the trays 14 fit closely against and may pass closely to the edges 68, 70 of the corrugated sheets 62.

The cryogenic coolant, such as liquid nitrogen, is introduced into the chimney 30 through an inlet pipe 74 and a thermostatically controlled solenoid valve 76 which is designed to control the admission of nitrogen into the freezing chimney 30. The thermostat preferably has a sensing probe near the tray inlet 16 which also is the coolant outlet. If desired, a suitable enclosure may be provided to insulate the valve 76 and other associated apparatus. The liquid nitrogen is admitted from the valve 76 into a distribution manifold 80 which is connected to each of four vertical spray pipes 82 which are located near each corner of the chimney. Each of the spray pipes 82 extends upwardly through openings formed in the deflectors 64, 66. The ends of each pipe 82 are closed and each pipe is provided with a series of vertically spaced nozzles 84. The nozzles 84 are designed to permit admission of a combination of liquid and gaseous nitrogen which flood the interior passage 72 of the chimney 30 to cool that region to a significantly low temperature. The nozzles 84 and the pipes 82 preferably are located between their associated deflector edges 68, 70 and, preferably, only between deflectors defining every other corrugation to assist in the zig-zag movement of the coolant. The nozzles preferably are arranged to direct the admitted spray in a fan configuration and in a slightly downwardly oriented angle to aim the spray more directly at the article within the tray as will more fully hereafter appear.

Figure 10:
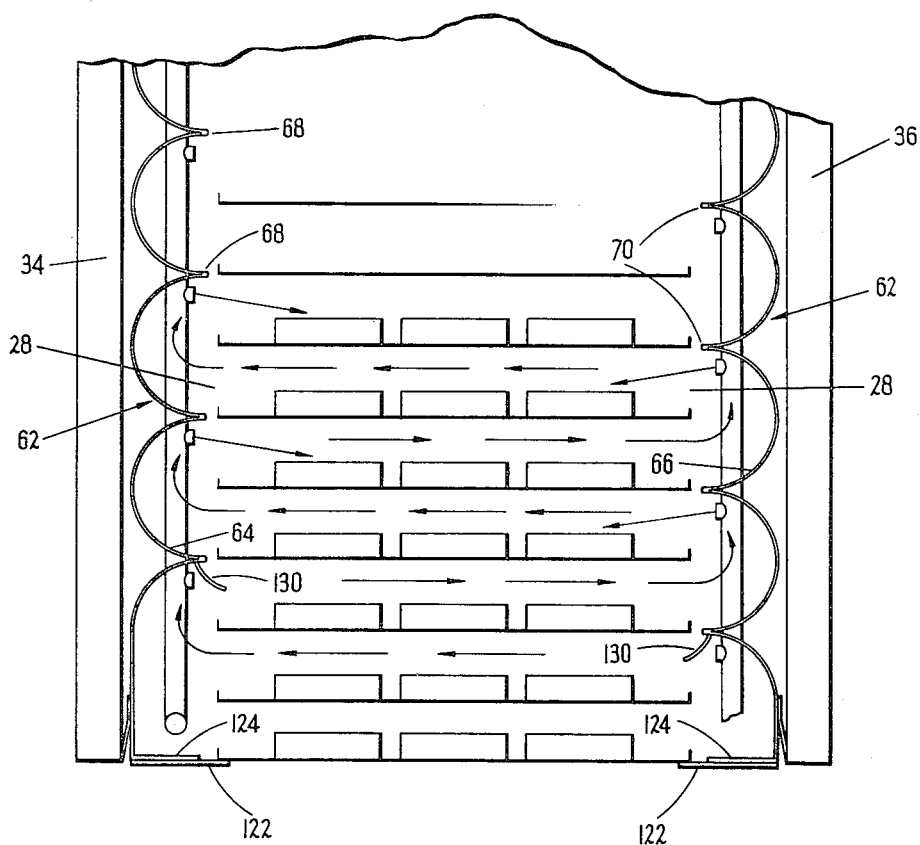
FIG. 10 is a sectional side elevation of the lower region of the freezing column illustrating the flow of coolant in relation to the trays and various sealing arrangements for the device.

The operation of the device will be understood more fully with reference to FIG. 10 showing, somewhat schematically, the stack of trays as it passes incrementally downwardly through the chimney. As shown, the flow across any tray is guided by that tray and the underside of the next uppermost tray. The flow then is redirected upwardly and in a reversed direction by the deflectors to flow through the passage 28 over the next uppermost tray. The serpentine, upward flow is continued for a predetermined time interval and in the direction shown by the arrows. The trays are arranged so that the bottom wall of each tray in the stack is in generally alternating alignment with the staggered deflector edges 68, 70. Also as suggested in FIG. 10, the nozzles direct their spray in a slightly downward oriented angle and in a fanned configuration both to assist the propagation of coolant flow and to direct the coolant intimately toward as many surfaces of the articles as possible. After a predetermined time interval, the stack is advanced downwardly in an amount equal to the height of one tray with the lowermost tray being removed. By advancing the stack of trays downwardly, each tray is presented to coolant flow in a reversed direction in relation to the tray. Thus, although the general direction of the coolant flow does not change, the incremental advancing of the tray produces a reversed flow effect in relation to the articles in the trays.

In the preferred embodiment of the invention, the spray pipes 82 include nozzles only up to approximately ⅔ of the height of the chimney. Additionally, the lower nozzles may be larger than the upper nozzles so that velocity of the jet from the upper nozzles will be increased and will assist substantially in the upward, serpentine propagation of the coolant. Upward, serpentine flow of the coolant is assisted further by one or more fans 86 which may be mounted to the upper end of the insulative rear wall 36. The motor 88 for the fan preferably is located outwardly of the freezing column 10 as shown. The motor 88 may be provided with appropriate thermostatic controls to control its operation in response to the temperature of the coolant just prior to its exhaustion to the atmosphere through the tray inlet opening 16.

The freezing column 10 is supported on a frame 90 by upwardly extending brackets 92 which support the underside of the insulative walls 32, 34, 36 and the underside of the chimney walls 56, 58, 60. The frame 90 also supports an endless conveyor belt 94 which is driven about the rolls 96, 98 by a suitable motor 100. The conveyor belt 94 is narrower than the chimney passage 72 and is located at a level below the bottom of the chimney. A platform 102 may be provided beneath the upper run of the belt to support the belt where it receives and transports the unloaded trays.

Figure 8:
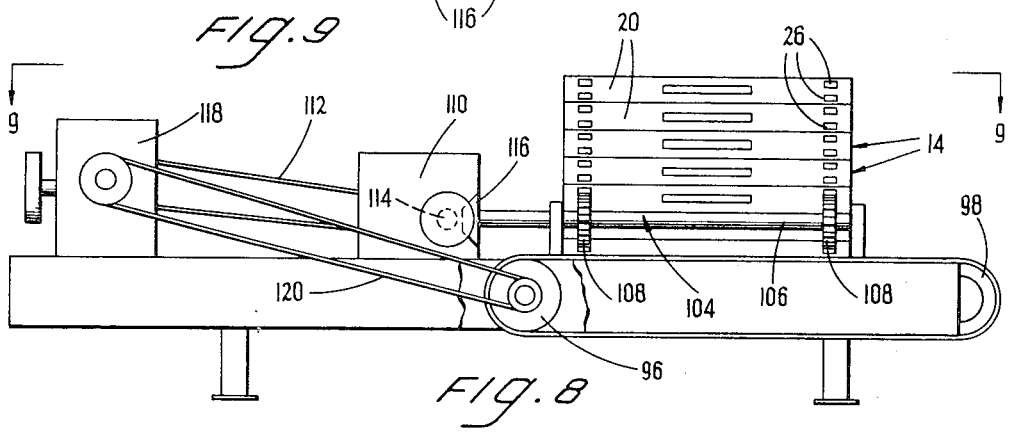
FIG. 8 is a side elevation of the arrangement shown in FIG. 7.
Figure 7:
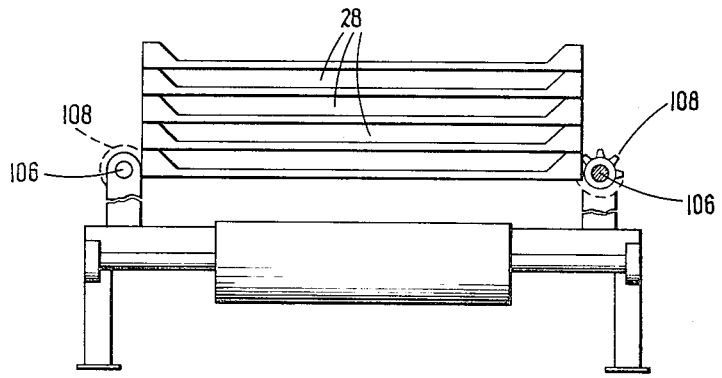
FIG. 7 is a front elevation of the lower portion of the device illustrating the advancing and ejection mechanism with the freezing column removed for clarity.

As shown in FIGS. 7, 8 and 9, the unloading mechanism further includes two pinion pairs 104, each pinion pair including a shaft 106 and a pair of pinions 108 secured to and in spaced relation along the shaft 106. Each shaft 106 is suitably journaled to the frame and the shafts 106 are spaced near the lower end of the freezing column 10 and on each side thereof. The pinions 108 are positioned on their respective shafts so that they may be registered and engagable with the holes 26 formed in the sidewalls 20 of the trays 14. In this regard, when the trays are stacked, the holes 26 of successively stacked trays will be spaced equally from each other so that they may effectively define a heightwise extending rack cooperative with the pinions 108. Thus, each hole 26 is spaced at a predetermined heightwise distance from its associated hole and each of the holes is spaced an amount equal to half of that distance from the top and bottom edges of the trays. The pinion pairs 104 are arranged to engage at all times the lowermost tray in the stack. To advance the stack downwardly one tray increment, the pinion pairs are rotated an appropriate amount, such as a quarter turn to release the lowermost tray onto the conveyor belt 94 and engage smoothly the next succeeding tray to support that tray and the remaining trays in the stack above.

The pinion pairs may be driven in unison by a variety of arrangements such as that shown in FIGS. 8 and 9 in which the main drive motor 100 drives a geneva mechanism 110 through a belt or chain 112 which, in turn, drives the shaft 106 through a shaft 114 and appropriate bevel gears 116 connected to the shafts 106. A speed reduction unit 118 is provided to enable both the geneva mechanism 110 and the conveyor drive, through the belt 120, to be powered from the same motor 100.

Figure 11:
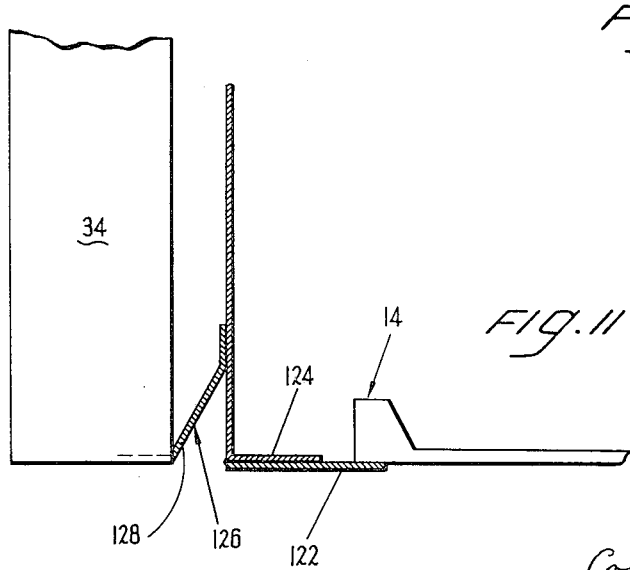
FIG. 11 is an enlarged illustration of the seal at the lower region of the freezing column between the lowermost tray and the chimney and between the chimney and an insulative outer wall.

Another aspect of the invention relates to an improved arrangement for sealing the lowermost tray in the stack to the lower end of the chimney to insure that ambient air does enter into the chimney and adversely effect the cryogenic conditions within the chimney passage. As shown in FIGS. 10 and 11, effective sealing of the chimney passage may be achieved by providing a transversely extending flat, thin strip 122 formed from a resilient material such as stainless steel at the front and rear portions of the bottom of the chimney. The lower end of the chimney may include the inwardly extending lip 124 to which the sealing strip 122 may be secured, as by welding. The sealing strips 122 extend inwardly beyond the deflector edges 68, 70 to present a restricted opening to downward passage of the lowermost tray. The inner edges of the strips 122 engage the forward and rearward margins of the bottom wall of the lower tray as shown in FIGS. 10 and 11. When the elevator means is operated to advance the stack downwardly one tray increment the resilience of the strips 122 permits the lowermost tray to pass through the restricted opening. Once the inner edges of the strips 122 have cleared the top of the withdrawn tray, they snap back upwardly into engagement with the underside of the next succeeding tray in the stack, thus maintaining the seal. If desired, a similar sealing arrangement may be provided at the lower end of the chimney between the chimney sidewalls 56 and the sidewalls 20 of the lowermost tray. This further sealing may be omitted because the trays are dimensioned to fit in close proximity to the chimney sidewalls 56 and leakage of ambient air would be minimal.

The preferred embodiment of the invention also includes an arrangement for sealing the void between the chimney and the insulative housing panels. As shown in FIG. 11, this arrangement includes a thin strip 126 of resilient sheet, such as stainless steel which may be secured at one end to the outer surface of each of the chimney walls and which has a free end 128 which extends outwardly toward and into engagement with the inner surface of the facing housing panel. The free end 128 of the strip 126 is biased firmly against the inner surface of its associated wall panel to maintain the seal. The strip 126 is quite thin, for example, of the order of .005 inch, so that if the outer insulative wall tends to bow or buckle, the free end of the strip 126 will tend to follow the bowed configuration of the outer wall panel thus maintaining the seal. The chimney-panel seal strip 126 may be provided both at the lower and upper ends of the freezing column 10 and between each of the chimney and column walls. It should be noted, however, that the strip seal 126 is not necessary in the lower region between the chimney sidewalls 56 and the insulative sidewalls 32. The void between these sidewalls is sealed effectively by the bracket 92 which supports both the chimney 30 and the insulative column at its sidewalls and spans the space between these sidewalls.

The efficiency of the invention is improved further by the provision of drip plates 130 located in the lower region of the chimney which serve to collect any liquid coolant which may have gravitated downwardly through the chimney along the walls of the chimney. As shown in FIG. 10, the drip plates 130 are secured to the lowermost deflectors 64, 66 on the front and rear corrugated sheets 62. Each of the drip plates 130 consists of a thin, flexible stainless steel strip which extends transversely along its associated deflector and which has an inwardly extending free resilient edge which projects inwardly beyond the associated edge 68, 70 of its deflector. The free edge of the drip plates 130 are intended to overlap slightly the front and rear walls 22 of the trays and are shorter in length than the widthwise dimension of the trays so that they may fit within the reduced opening formed in the front and rear walls 22 of the trays. Any liquid cryogenic coolant which drips down the deflector plate 64, 66 thus will be redirected into one of the lower trays to provide further freezing for the articles in the trays. The drip plates 130 are relatively thin so that they may flex in response to incremental advancement of the tray stack and thus do not interfere with advancement of the trays.

Thus, I have described my invention in which articles such as food may be quick frozen simply and efficiently with relatively simple inexpensive apparatus and with high efficiency. It should be understood, however, that the foregoing description is intended merely to be illustrative of the invention and that other embodiments and modifications will be apparent to those skilled in the art without departing from its spirit.

Having thus described the invention, what I desire to claim and secure by Letters Patent is:

1. An apparatus for quick freezing of articles comprising:
   a heightwise extending freezing column having an inlet at one end and an outlet at the other end, said column being receptive to a plurality of trays disposed in a heightwise stack within said column, said trays being receptive to said articles to be frozen;
   means for advancing incrementally said stack of trays from said inlet to said outlet;
   means for withdrawing said trays successively from said outlet end;
   means for flowing a coolant within said freezing column along a path extending between the ends of said column;
   means formed interiorly of said column for cooperation with said trays in said stack for directing the flow path of said coolant along a serpentine path in directions transverse to the direction of advancement of said stack of trays, said serpentine flow path being arranged in heightwise spaced tiers, said last mentioned means being arranged so that said coolant flows successively from one tier to another and in opposite directions in successive tiers, said tiers defined at least in part by adjacent trays in said stacks;
   said means for advancing incrementally said stack of trays being constructed to advance said trays in increments to present each tray in said stack to the next successive tier in said column;
   whereby as said trays and articles supported therein are advanced toward said outlet they are successively subjected to flow of said coolant in reversed directions.

2. An apparatus as defined in claim 1 wherein said elevator means comprises:
   means engagable with the lowermost tray in said stack, the remaining trays in said stack being supported by said lowermost tray.

3. An apparatus as defined in claim 1 further comprising:
   said trays being so constructed and arranged as to rest directly one atop each other in said stack, said trays having sidewalls and openings formed in opposite of said sidewalls to permit said coolant to flow transversely between adjacent trays in said stack.

4. An apparatus for quick freezing of articles as defined in claim 1 wherein said coolant comprises a cryogenic fluid, said apparatus further comprising:
   a portion of said cryogenic fluid being in the gaseous phase and being flowable readily along said serpentine path;
   means for emitting a jet of said cryogenic fluid in a liquid phase in association with selected of said tiers, said liquid jets being oriented to assist flow of the gaseous phase of said cryogenic fluid in the transverse direction associated with its respective tier.

5. An apparatus as defined in claim 1 wherein said means for advancing said stack of trays from said inlet to said outlet comprises:
   means on opposite sides of and at the lower, outlet end of said freezing column for engaging and supporting the lowermost of said trays in said stack and to support the remaining upper trays on said lowermost tray;
   means constructing said tray engaging means to advance the lowermost tray one increment downwardly toward said outlet to enable the remaining, supported trays to gravitate downwardly one increment, said elevator means being adapted to release the lowermost of said trays and engage the next succeeding tray in said advancing stack; and drive means for operating said elevator means in incremental steps.

6. An apparatus as defined in claim 5 wherein each of said trays comprises:

each of said trays having sidewalls on opposite sides thereof, each of said sidewalls having at least two heightwise spaced holes formed therein which, when stacked with identical trays, define a plurality of heightwise extending regularly spaced holes and wherein said elevator means comprises:

pinion means engagable with the holes in said trays as said trays are advanced downwardly into engagement with said pinion means; and means for rotating said pinions in increments sufficient to release one tray at a time.

7. An apparatus as defined in claim 1 wherein said means for directing said coolant along said serpentine path further comprises:

a plurality of deflectors disposed on each of opposite sides of the inner surface of said freezing column, each of said deflectors extending parallel to each other, said deflectors on one side of said column being vertically offset with respect to the deflectors on the other side of said column in an amount equal to approximately ½ of the height of one of said trays.

8. An apparatus as defined in claim 7 wherein a substantial portion of said coolant is emitted in a cryogenic liquified phase and further comprising:

a drip plate secured to the lower end of each of said inner deflection surfaces of said column, said drip plates extending inwardly into the passage within said column to direct any dripping liquid coolant onto the lowermost tray, said drip plates being resilient to permit said trays to pass downwardly therethrough.

9. An apparatus as defined in claim 7 further comprising:

a flap seal located at the lower end of said freezing column and being engagable with the underside of the lowermost tray in said stack to seal said column to said tray, said flap seal being resilient to thereafter permit said tray to be released.

10. An apparatus as defined in claim 2 wherein said means for flowing said coolant within said freezing column comprises:

a plurality of said tiers each having nozzle means arranged to emit a jet of said coolant substantially only in a direction which assists propagation of coolant in the transverse flow direction of its associated tier.

11. An apparatus as defined in claim 10 where approximately only the lower ⅔ of said column includes said nozzles.

12. An apparatus as defined in claim 10 further comprising:

blower means at said inlet end to assist in propagation of said coolant from said outlet to said inlet end.

13. An apparatus as defined in claim 10 wherein each of said nozzles means is so constructed and arranged as to emit a divergent jet of said coolant in a slightly downward direction whereby said jet is directed against the articles supported within its associated tray.

14. An apparatus as defined in claim 13 wherein each of said tiers includes two of said nozzles means located at opposite ends of the same side of said column.

15. An apparatus for quick freezing of articles comprising:

a heightwise extending freezing column having an inlet at one end and an outlet at the other end;

said column including outer wall means formed from a thermally insulative material;

said freezing column further including an inner freezing chimney receptive to a plurality of trays disposed in a heightwise stack within said freezing chimney, said trays being receptive to articles to be frozen, said inner chimney being defined by inner wall means spaced from the internal surface of said outer wall means and being formed from a thin non-corrosive sheet material, said outer wall means being flexible independently of said inner freezing chimney whereby flexure of said outer wall means in response to any thermal gradient developed thereacross will have substantially no adverse effect on the configuration of said freezing chimney;

means for advancing incrementally said stack of trays from said inlet to said outlet;

means for withdrawing said tray successively from said outlet end;

means for flowing a coolant within said freezing column along a path extending between the ends of said column; and means for directing the flow path of said coolant along a serpentine path in directions transverse to the direction of advancement of said stack of trays whereby as said trays and articles supported therein are advanced toward said outlet end they are successively subjected to flow of said coolant in reversed directions, at least a part of said means for directing said flow path of coolant comprising said trays.

16. An apparatus as defined in claim 15 further comprising:

means for sealing said outer wall means and said chimney to each other at their ends comprising a resilient metallic strip connected to said ends of said chimney and bearing against the adjacent ends of said outer wall means, said strips spanning the space between said chimney and said wall means.

17. An apparatus as defined in claim 15 wherein said outer wall means comprises:

a plurality of panels of thermally insulative material, each of said panels being covered with a thin, metallic skin of non-corrosive material, each of said panels being joined along its heightwise extending edge to the heightwise extending edge of its adjacent panels to define said outer wall;

means for sealing the juncture of said panel edges to permit flexure of said panels relative to each other and to maintain said seal therebetween; and means for releasably connecting said panels together in said outer wall configuration.

18. An apparatus as defined in claim 17 wherein said means for sealing said heightwise juncture between said panels comprises:

said edges of said panels being rabbeted to define an inner interface and an outer interface along each juncture;

a resilient strip gasket extending along the outer interface at each juncture; and a resilient metallic strip extending along the inner interface of each juncture, each of said metallic strips being secured to the edge of one of said panels and having a free edge engagable and biased toward the edge of the other of said panels.

* * * * *